(12) United States Patent
McCaffrey

(10) Patent No.: US 12,152,551 B1
(45) Date of Patent: Nov. 26, 2024

(54) VARIABLE AREA NOZZLE FOR AN AIRCRAFT ENGINE

(71) Applicant: RTX Corporation, Farmington, CT (US)

(72) Inventor: Michael G. McCaffrey, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/411,832

(22) Filed: Jan. 12, 2024

(51) Int. Cl.
*F02K 1/06* (2006.01)
*F02K 1/08* (2006.01)

(52) U.S. Cl.
CPC . *F02K 1/06* (2013.01); *F02K 1/08* (2013.01)

(58) Field of Classification Search
CPC .... F02K 1/1238; F02K 1/1246; F02K 1/1253; F02K 1/1261; F02K 1/1276; F02K 1/1284; F02K 1/1292; F02K 1/06; F02K 1/08
See application file for complete search history.

(56) References Cited

U.S. PATENT DOCUMENTS

| | | | | |
|---|---|---|---|---|
| 3,192,712 A * | 7/1965 | Dudley | ...................... | F02K 9/78 239/455 |
| 3,807,639 A * | 4/1974 | Soligny | ...................... | F02K 1/08 239/265.19 |
| 8,875,486 B2 | 11/2014 | Roberts | | |
| 9,359,972 B2 * | 6/2016 | Roberts | ................... | F16C 29/02 |
| 11,536,454 B2 | 12/2022 | Hu | | |

* cited by examiner

*Primary Examiner* — Kyle Robert Thomas
(74) *Attorney, Agent, or Firm* — Getz Balich LLC

(57) ABSTRACT

An assembly for an aircraft engine includes a variable area nozzle. The variable area nozzle includes a nozzle wall, a nozzle sleeve, an actuation system and a flowpath extending axially along an axis through the variable area nozzle and radially between the nozzle wall and the nozzle sleeve. The nozzle sleeve includes a support and a liner. The support includes a first mount and a second mount axially spaced from the first mount. The liner extends axially along and circumferentially about the support. The liner is axially and circumferentially anchored to the support through the first mount. The liner is circumferentially anchored to the support through the second mount. The actuation system is coupled to the support. The actuation system is configured to move the nozzle sleeve axially along the axis relative to the nozzle wall.

20 Claims, 10 Drawing Sheets

VARIABLE AREA NOZZLE FOR AN AIRCRAFT ENGINE

BACKGROUND OF THE DISCLOSURE

1. Technical Field

This disclosure relates generally to an aircraft engine and, more particularly, to a variable area nozzle for the aircraft engine.

2. Background Information

An aircraft engine may include a variable area nozzle. Various types and configurations of variable area nozzles are known in the art. While these known variable area nozzles have various benefits, there is still room in the art for improvement.

SUMMARY OF THE DISCLOSURE

According to an aspect of the present disclosure, an assembly is provided for an aircraft engine. This assembly includes a variable area nozzle. The variable area nozzle includes a nozzle wall, a nozzle sleeve, an actuation system and a flowpath extending axially along an axis through the variable area nozzle and radially between the nozzle wall and the nozzle sleeve. The nozzle sleeve includes a support and a liner. The support includes a first mount and a second mount axially spaced from the first mount. The liner extends axially along and circumferentially about the support. The liner is axially and circumferentially anchored to the support through the first mount. The liner is circumferentially anchored to the support through the second mount. The first mount and the second mount each provide at least one degree of freedom between the liner and the support. The actuation system is operatively coupled to the support. The actuation system is configured to move the nozzle sleeve axially along the axis relative to the nozzle wall.

According to another aspect of the present disclosure, another assembly is provided for an aircraft engine. This assembly includes a support and a liner. The support includes a base, a first mount and a second mount. The base extends axially along and circumferentially about a centerline axis. The first mount includes a plurality of mount arms arranged circumferentially about the axis. Each of the mount arms is cantilevered from the base. The second mount is axially spaced from the first mount along the centerline axis. The liner extends axially along and circumferentially about the centerline axis. The liner is attached to each of the mount arms. The liner is coupled to and slidable along the second mount. The liner forms a radial peripheral boundary of a flowpath with the liner radially between the support and the flowpath.

According to still another aspect of the present disclosure, another assembly is provided for an aircraft engine. This assembly includes a variable area nozzle. The variable area nozzle includes a nozzle wall, a nozzle sleeve, an actuator and a flowpath extending axially along an axis through the variable area nozzle and radially between the nozzle wall and the nozzle sleeve. The nozzle sleeve includes a support and a liner. The support includes a base and a plurality of mount arms. The base extends axially along and circumferentially about the axis. The mount arms are cantilevered from the base and arranged circumferentially about the axis. The liner extends axially along and circumferentially about the axis. The liner is attached to each of the mount arms. The liner forms a radial peripheral boundary of the flowpath with the liner radially between the support and the flowpath. The actuator is operatively coupled to the support. The actuator is configured to move the nozzle sleeve axially along the axis relative to the nozzle wall.

The support and the liner may be configured as part of a nozzle.

The liner may circumscribe the support. The flowpath may circumscribe the liner.

The first mount may provide a radial degree of freedom between the liner and the support.

The support may also include a base extending axially along and circumferentially about the axis. The first mount may include a plurality of mount arms arranged circumferentially about the axis. Each of the mount arms may project axially out from the base to a respective distal arm end. The liner may be attached to each of the mount arms at the respective distal arm end.

Each of the mount arms may be flexible such that the respective distal arm end is operable to radially move relative to the base.

The liner may be attached to each of the mount arms with a respective fastener.

The first mount may also include a plurality of spring elements. Each of the spring elements may be arranged radially between the liner and a respective one of the mount arms.

The first mount may also include a plurality of spacers. Each of the spacers may be arranged radially between the liner and a respective one of the spring elements. Each of the spring elements may be seated in a recess in a respective one of the spacers.

The second mount may provide an axial degree of freedom between the liner and the support.

The second mount may also provide a radial degree of freedom between the liner and the support.

The second mount may include a plurality of slots and a plurality of sliders. The slots may be arranged circumferentially about the axis. Each of the slots may extend radially through the support. Each of the sliders may be configured to slide axially along a respective one of the slots.

The slots may include a first slot. The sliders may include a first slider mated with the first slot. A portion of the support may be radially captured between an inner segment of the first slider and an outer segment of the first slider.

Each of the sliders may be circumferentially fixed within the respective one of the slots.

The liner may be attached to each of the sliders with a respective fastener.

The support may also include a base extending axially along and circumferentially about the axis. The second mount may also include a plurality of mount arms arranged circumferentially about the axis. Each of the mount arms may project axially out from the base to a respective distal arm end. Each of the slots may extend radially through a respective one of the mount arms.

Each of the mount arms may be flexible such that the respective distal arm end is operable to radially move relative to the base.

The first mount may be downstream of the second mount along the flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
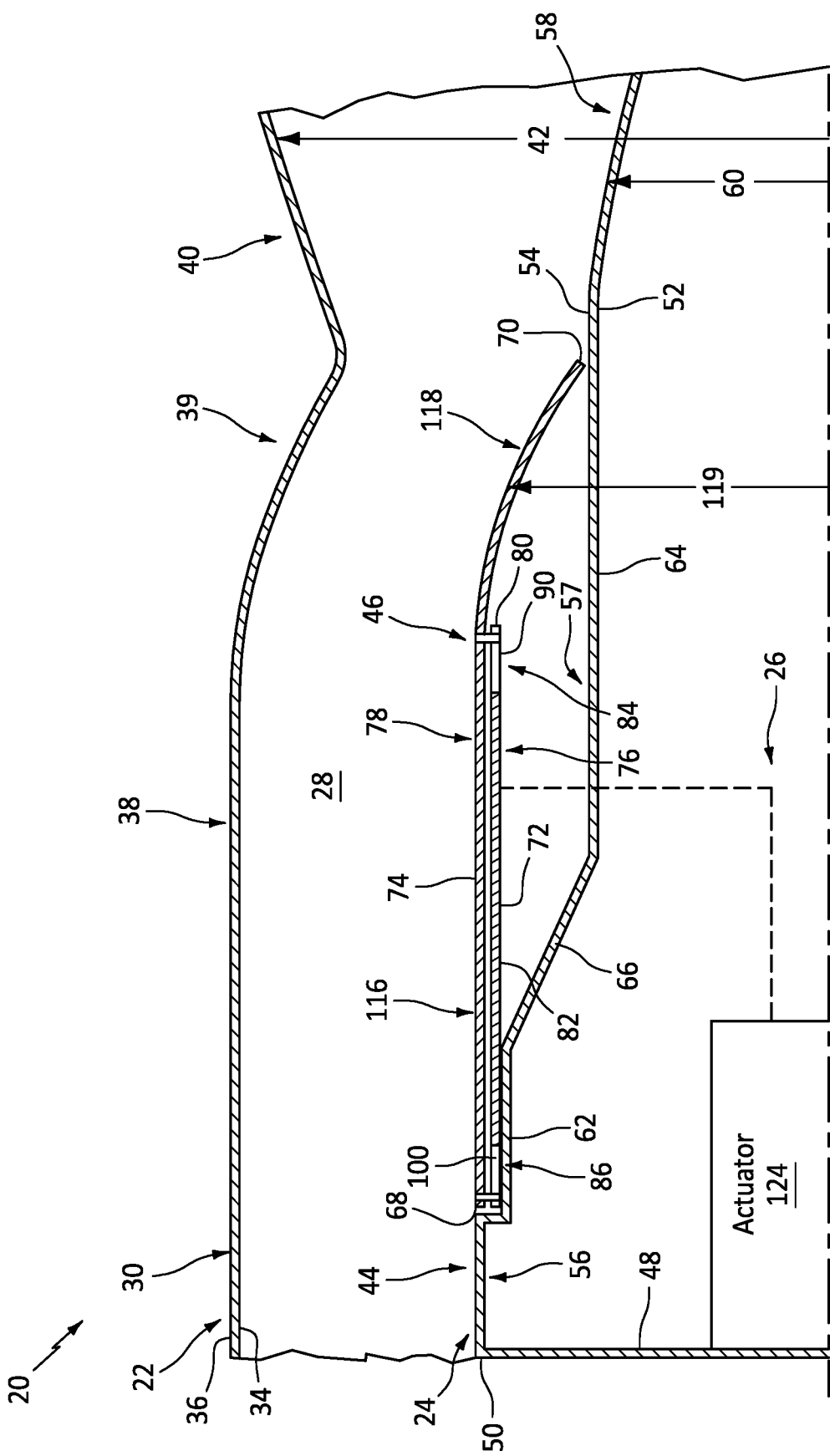
FIG. 1 is a partial side schematic sectional illustration of a variable area nozzle.

FIG. 1 illustrates a (e.g., convergent-divergent) variable area nozzle 20 for an engine of an aircraft. The aircraft engine may be a gas turbine engine, a pulsejet engine, a rotating detonation engine, a ramjet engine or any other type of suitable combustion engine. This aircraft engine may be configured as, or included as part of, a propulsion system for the aircraft. The aircraft engine may alternatively (or also) be configured as, or included as part of, an electrical power system for the aircraft. The aircraft may be an airplane, a helicopter, a drone (e.g., an unmanned aerial vehicle (UAV)) or any other manned or unmanned aerial vehicle or system. The variable area nozzle 20 includes a nozzle outer structure 22, a nozzle inner structure 24, an actuation system 26 and a flowpath 28; e.g., a core flowpath of the aircraft engine.

The outer structure 22 may be configured as or otherwise include an outer nozzle wall 30; e.g., a tubular flowpath wall. This outer nozzle wall 30 extends axially along an axis 32 from a forward, upstream end of the outer nozzle wall 30 to an aft, downstream end of the outer nozzle wall 30, which outer nozzle wall ends are not visible in FIG. 1. Briefly, the axis 32 may be a centerline axis of the variable area nozzle 20 and/or one or more of its members 22, 24, 26 and 28. The axis 32 may also or alternatively be a rotational axis of one or more rotating structures within the aircraft engine. The outer nozzle wall 30 extends circumferentially about (e.g., completely around) the axis 32, which may provide the outer nozzle wall 30 with a full-hoop (e.g., tubular) geometry. The outer nozzle wall 30 extends radially between and to a radial inner side 34 of the outer structure 22 and its outer nozzle wall 30 and a radial outer side 36 of the outer nozzle wall 30.

The outer nozzle wall 30 of FIG. 1 is configured with one or more wall sections 38-40. The upstream wall section 38 may extend axially from the upstream end of the outer nozzle wall 30 to the intermediate wall section 39. This upstream wall section 38 of FIG. 1 has a (e.g., regular) cylindrical geometry. The intermediate wall section 39 extends axially between and is connected to the upstream wall section 38 and the downstream wall section 40. This intermediate wall section 39 of FIG. 1 has a (e.g., curved) frustoconical geometry and may form a convergent section of the outer structure 22 and its outer nozzle wall 30. A radius 42 from the axis 32 to the outer wall inner side 34, for example, decreases as the intermediate wall section 39 extends axially along the axis 32 from (or about) the upstream wall section 38 to (or about) the downstream wall section 40. The downstream wall section 40 may extend axially from the intermediate wall section 39 to the downstream end of the outer nozzle wall 30. This downstream wall section 40 of FIG. 1 has a (e.g., curved) frustoconical geometry and may form a divergent section of the outer structure 22 and its outer nozzle wall 30. The radius 42 from the axis 32 to the outer wall inner side 34, for example, increases as the downstream wall section 40 extends axially along the axis 32 from (or about) the intermediate wall section 39 to (or towards) the downstream end of the outer nozzle wall 30. The present disclosure, however, is not limited to such an exemplary outer nozzle wall arrangement. For example, the outer nozzle wall 30 may omit the downstream wall section 40 and, thus, may omit the divergent section of the outer structure 22 and its outer nozzle wall 30. In addition or alternatively, the upstream wall section 38 may be configured as an upstream extension of the intermediate wall section 39 and, thus, the convergent section of the outer structure 22 and its outer nozzle wall 30.

The outer structure 22 and its outer nozzle wall 30 are spaced radially outboard from the inner structure 24 and its members (e.g., 44 and 46) by the flowpath 28. The outer structure 22 and its outer nozzle wall 30 also extend axially along (e.g., axially overlap) and extend circumferentially about (e.g., circumscribe) the inner structure 24 and its members (e.g., 44 and 46). With this arrangement, the outer structure 22 and its outer nozzle wall 30 may form a radial outer peripheral boundary of the flowpath 28 axially through the variable area nozzle 20.

The inner structure 24 of FIG. 1 includes the inner nozzle wall 44 (e.g., a sleeve support wall) and the translating nozzle sleeve 46. The inner structure 24 of FIG. 1 also includes an actuator mount 48.

The inner nozzle wall 44 extends axially along the axis 32 from a forward, upstream end 50 of the inner nozzle wall 44 to an aft, downstream end of the inner nozzle wall 44, which inner nozzle wall downstream end is not visible in FIG. 1. The inner nozzle wall 44 extends circumferentially about (e.g., completely around) the axis 32, which may provide the inner nozzle wall 44 with a full-hoop (e.g., tubular) geometry. The inner nozzle wall 44 extends radially between and to a radial inner side 52 of the inner nozzle wall 44 and a radial outer side 54 of the inner nozzle wall 44.

The inner nozzle wall 44 of FIG. 1 is configured with one or more wall sections 56-58. The upstream wall section 56 extends from the upstream end 50 of the inner nozzle wall 44 to the intermediate wall section 57. This upstream wall section 56 of FIG. 1 has a (e.g., regular) cylindrical geometry. The intermediate wall section 57 extends axially between and is connected to the upstream wall section 56 and the downstream wall section 58. The downstream wall section 58 may extend axially from the intermediate wall section 57 to the downstream end of the inner nozzle wall 44. This downstream wall section 58 of FIG. 1 has a (e.g., curved) frustoconical geometry and may form a divergent section of the inner structure 24 and its inner nozzle wall 44. A radius 60 from the axis 32 to the inner wall outer side 54, for example, decreases as the downstream wall section 58 extends axially along the axis 32 from (or about) the intermediate wall section 57 to (or towards) the downstream end of the inner nozzle wall 44.

The intermediate wall section 57 of FIG. 1 includes an upstream guide 62 (e.g., a land), a downstream guide 64 (e.g., a land) and a transition 66. The upstream guide 62 is connected to the upstream wall section 56, and the upstream guide 62 is disposed axially adjacent and aft, downstream of the upstream wall section 56. This upstream guide 62 of FIG. 1 is (e.g., slightly) radially recessed inward (radially towards the axis 32) from the upstream wall section 56. The upstream guide 62 may have a (e.g., regular) cylindrical geometry. The downstream guide 64 is connected to the downstream wall section 58, and the downstream guide 64 is disposed axially adjacent and forward, upstream of the downstream wall section 58. This downstream guide 64 of FIG. 1 is radially recessed inward (radially towards the axis 32) from the upstream guide 62. The transition 66 extends axially between and is connected to the upstream guide 62 and the downstream guide 64. This transition 66 has a frustoconical geometry and radially tapers from the upstream guide 62 to the downstream guide 64. The radius 60 from the axis 32 to the inner wall outer side 54, for example, decreases as the intermediate wall section 57 and its transition 66 extend axially along the axis 32 from (or about) the upstream guide 62 to (or towards) the downstream guide 64. The present disclosure, however, is not limited to such an exemplary inner nozzle wall arrangement. For example, the upstream wall section 56 may be omitted and the upstream guide 62 may be disposed at the upstream end 50 of the inner nozzle wall 44.

The nozzle sleeve 46 extends axially along the axis 32 from a forward, upstream end 68 of the nozzle sleeve 46 to an aft, downstream end 70 of the nozzle sleeve 46. The nozzle sleeve 46 extends circumferentially about (e.g., completely around) the axis 32, which may provide the nozzle sleeve 46 with a full-hoop (e.g., tubular) geometry; see also FIGS. 4 and 6. The nozzle sleeve 46 extends radially between and to a radial inner side 72 of the nozzle sleeve 46 and a radial outer side 74 of the nozzle sleeve 46. The nozzle sleeve 46 of FIG. 1 includes a sleeve support 76 and a sleeve liner 78.

Figure 2:
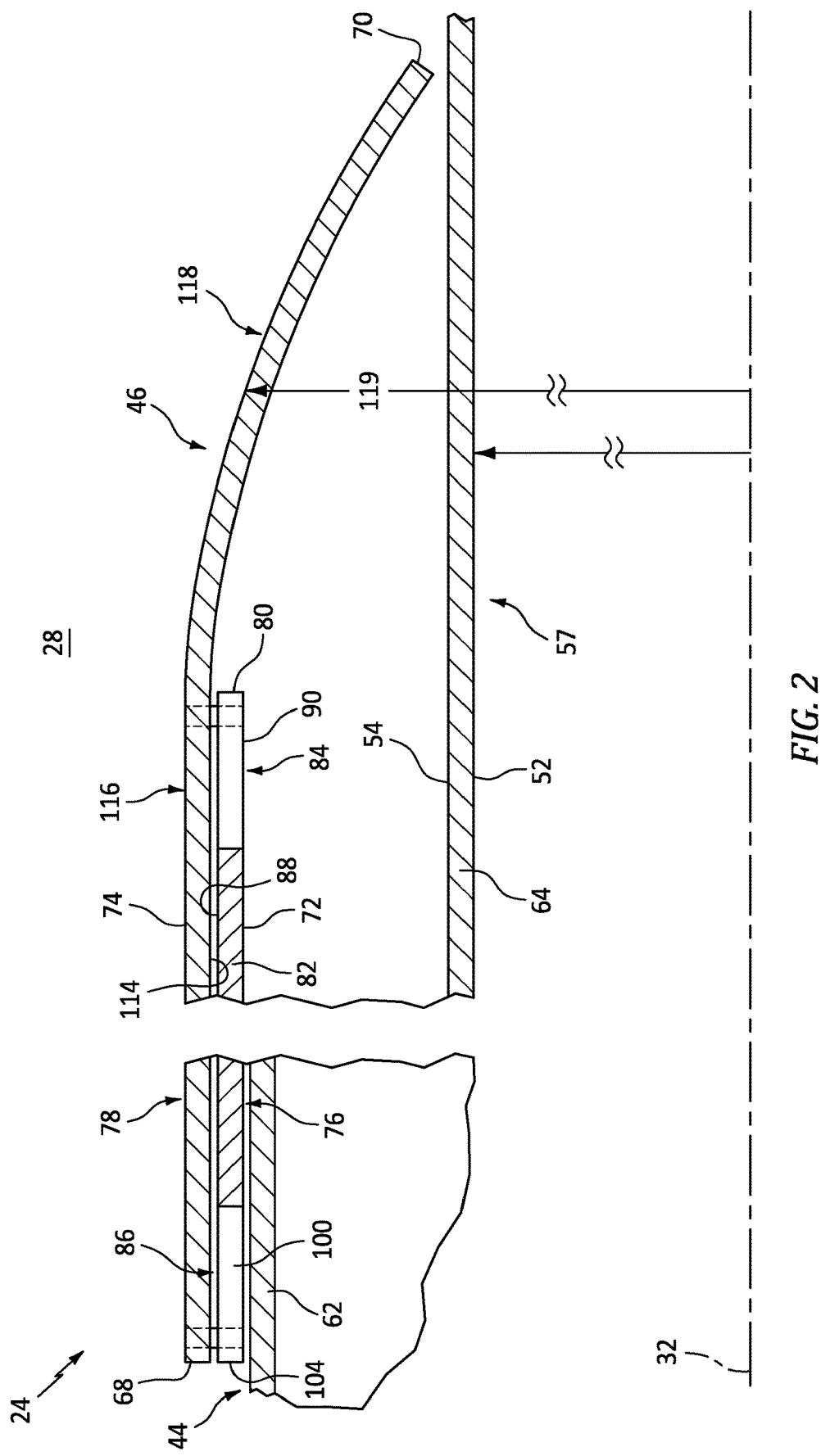
FIG. 2 is a partial side schematic sectional illustration of a nozzle inner structure of the variable area nozzle.

The sleeve support 76 may be configured as a shell, a frame, a backbone and/or another structure which structurally supports and/or carries the sleeve liner 78. Referring to FIG. 2, the sleeve support 76 extends axially along the axis 32 from (or about) the sleeve upstream end 68 to an aft, downstream end 80 of the sleeve support 76. Here, the support downstream end 80 is axially recessed (forward, upstream) of the sleeve downstream end 70. It is contemplated, however, the support downstream end 80 may alternatively be arranged at (e.g., on, adjacent or proximate) the sleeve downstream end 70. It is also contemplated a forward, upstream end of the sleeve support 76 may alternatively be axially recessed (aft, downstream) of the sleeve upstream end 68. Referring again to FIG. 2, the sleeve support 76 includes a support base 82 and one or more support mounts 84 and 86.

The support base 82 extends axially along the axis 32 between and to the downstream mount 84 and the upstream mount 86. The support base 82 extends circumferentially about (e.g., completely around) the axis 32, which may provide the support base 82 and, more generally, the sleeve support 76 with a full-hoop (e.g., tubular) geometry. The support base 82 extends radially between and to the sleeve inner side 72 and a radial outer side 88 of the support base 82.

Figure 3:
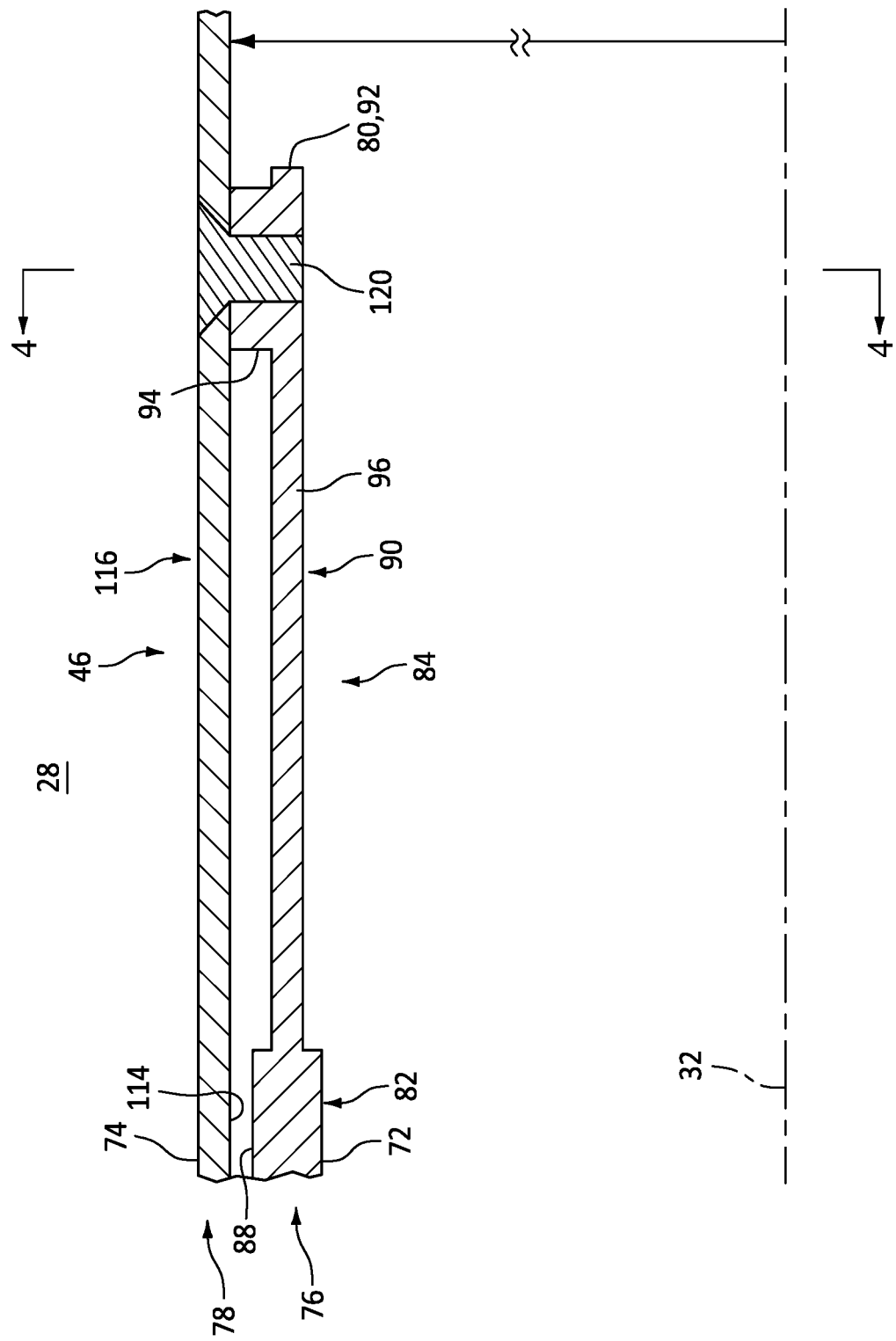
FIG. 3 is a partial side sectional illustration of a nozzle sleeve at a downstream mount.
Figure 4:
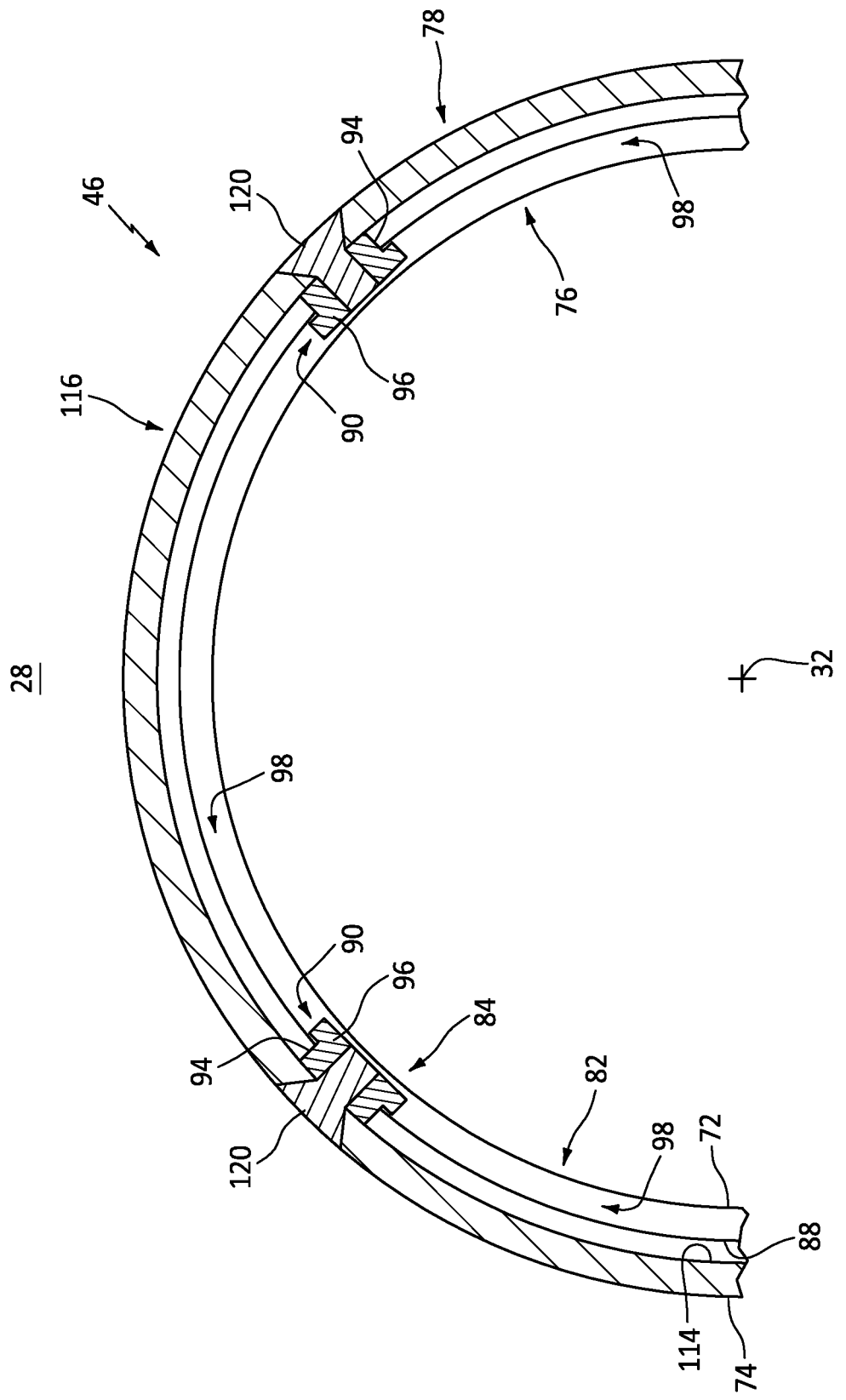
FIG. 4 is a partial cross-sectional illustration of the nozzle sleeve taken along line 4-4 in FIG. 3.

Referring to FIGS. 3 and 4, the downstream mount 84 includes a plurality of downstream mount arms 90. These downstream mount arms 90 are arranged and may be equispaced circumferentially about the axis 32 in an array; e.g., a circular array. Referring to FIG. 3, each of the downstream mount arms 90 is cantilevered from the support base 82. Each of the downstream mount arms 90 of FIG. 3, for example, is connected to (e.g., formed integral with or otherwise attached to) the support base 82. Each of the downstream mount arms 90 projects longitudinally (e.g., axially aft, downstream) out from the support base 82 to an unsupported distal arm end 92 of the respective downstream mount arm 90. At its distal arm end 92, each downstream mount arm 90 may include an integral boss 94 which projects vertically (e.g., radially outward) from a base 96 of the respective downstream mount arm 90. Referring to FIG. 4, each circumferentially neighboring (e.g., adjacent) pair of the downstream mount arms 90 may be separated by a respective downstream mount channel 98. These downstream mount channels 98 are thereby circumferentially interspersed with the downstream mount arms 90.

Figure 5:
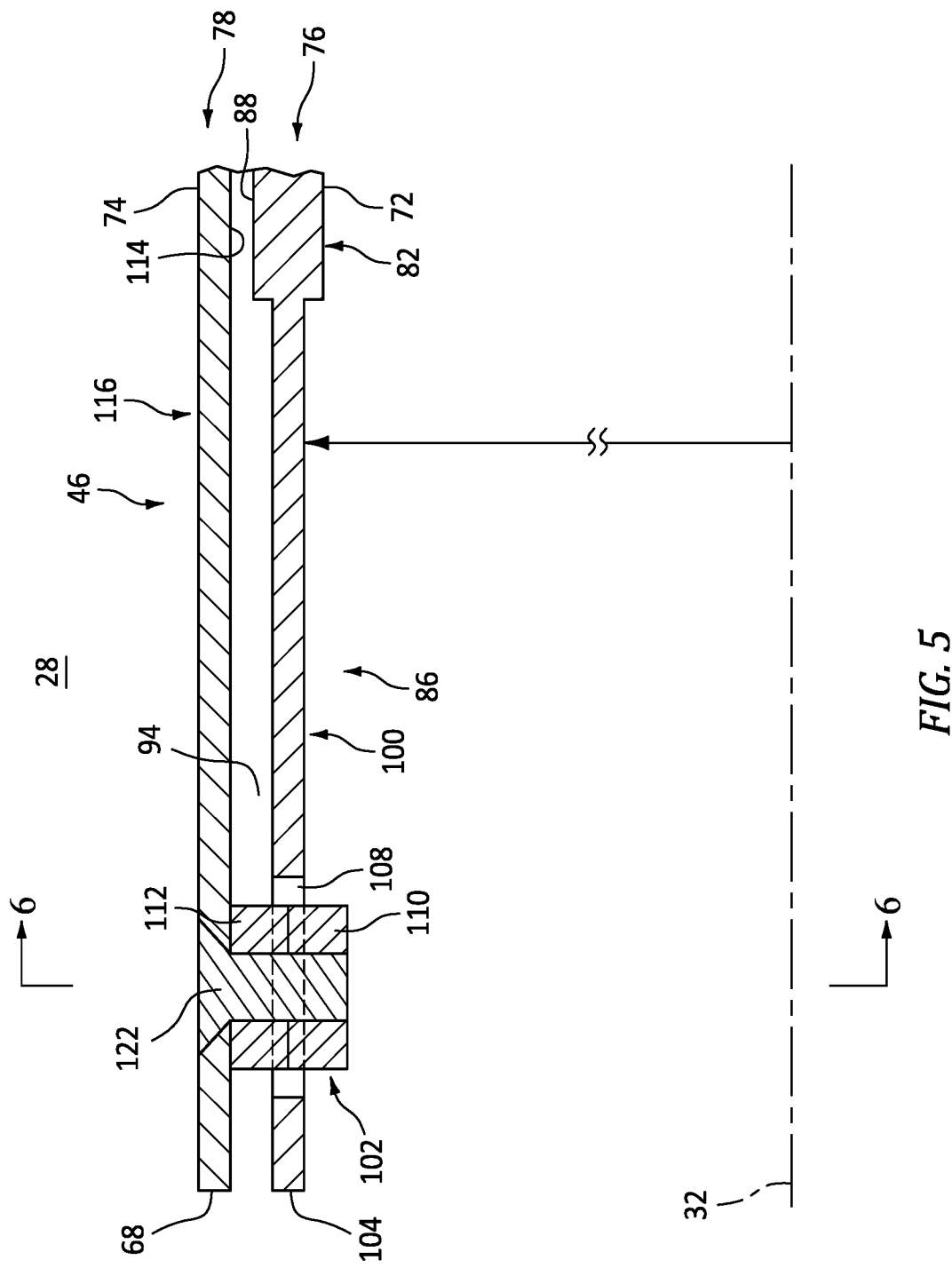
FIG. 5 is a partial side sectional illustration of a nozzle sleeve at an upstream mount.
Figure 6:
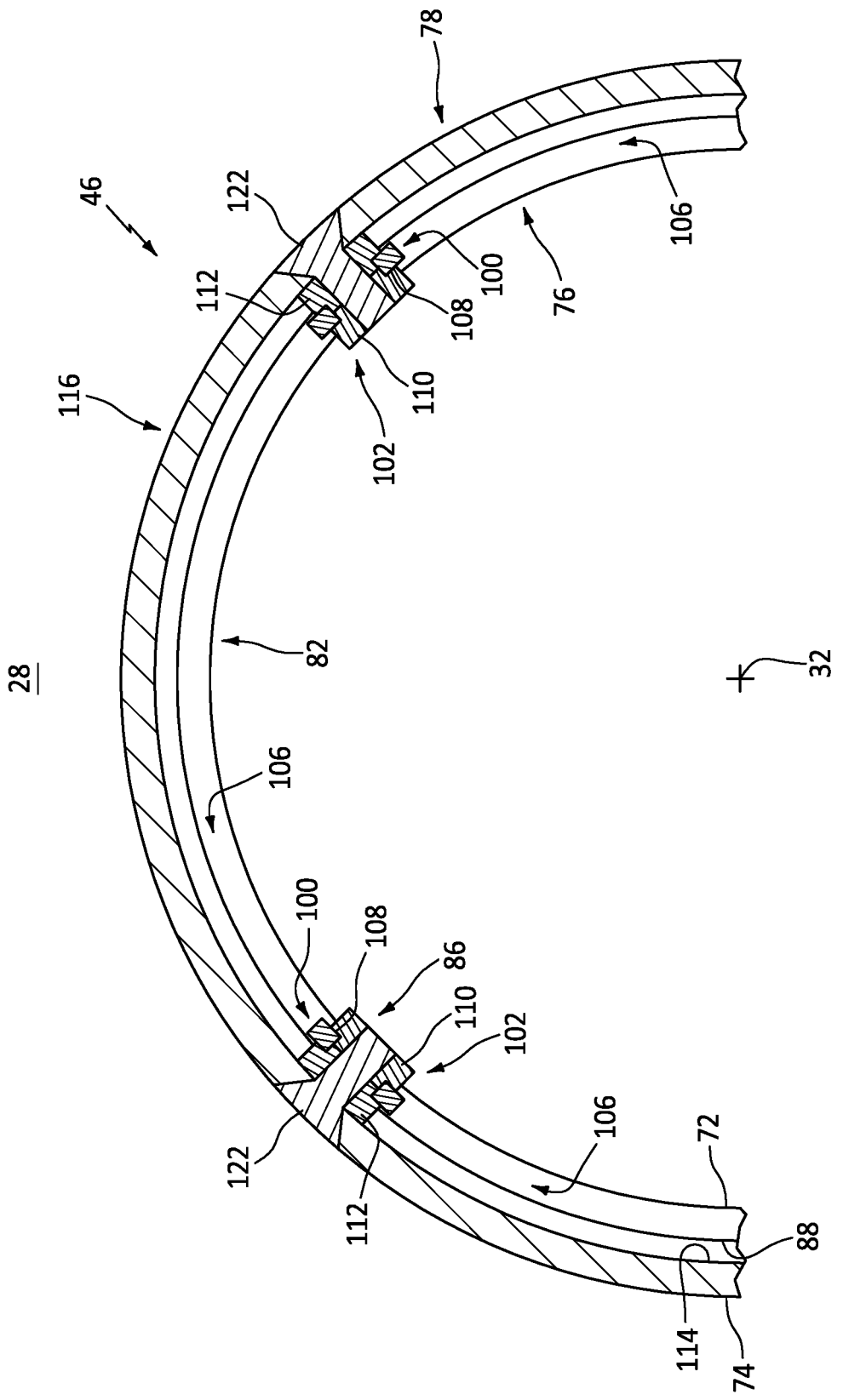
FIG. 6 is a partial cross-sectional illustration of the nozzle sleeve taken along line 6-6 in FIG. 5.

Referring to FIGS. 5 and 6, the upstream mount 86 includes a plurality of upstream mount arms 100 and a plurality of sliders 102. These upstream mount arms 100 are arranged and may be equispaced circumferentially about the axis 32 in an array; e.g., a circular array. Referring to FIG. 5, each of the upstream mount arms 100 is cantilevered from the support base 82. Each of the upstream mount arms 100 of FIG. 5, for example, is connected to (e.g., formed integral with or otherwise attached to) the support base 82. Each of the upstream mount arms 100 projects longitudinally (e.g., axially forward, upstream) out from the support base 82 to an unsupported distal arm end 104 of the respective upstream mount arm 100. Referring to FIG. 6, each circumferentially neighboring (e.g., adjacent) pair of the upstream mount arms 100 may be separated by a respective upstream mount channel 106. These upstream mount channels 106 are thereby circumferentially interspersed with the upstream mount arms 100.

Referring to FIG. 5, at its distal arm end 104, each upstream mount arm 100 includes a slot 108; e.g., an axially elongated slot. This slot 108 projects vertically (e.g., radially) through the respective upstream mount arm 100 between opposing vertical sides of the respective upstream mount arm 100. The slot 108 extends longitudinally (e.g., axially) within the respective upstream mount arm 100 between opposing longitudinal ends of the slot 108. Referring to FIG. 6, the slot 108 extends laterally (e.g., circumferentially or tangentially) within the respective upstream mount arm 100 between opposing lateral sides of the slot 108. Here, the slots 108 are arranged circumferentially about the axis 32 in an array; e.g., a circular array.

Each of the sliders 102 is mated with a respective one of the slots 108. Each slider 102 of FIG. 6, for example, has an I-shaped (or H-shaped) cross-sectional geometry when viewed, for example, in a reference plane perpendicular to the axis 32. Each slider 102 of FIG. 6, in particular, includes an inner segment 110 and an outer segment 112. The inner segment 110 includes an inner platform and an inner protrusion. The inner platform is disposed radially inboard of and may radially engage (e.g., contact) a respective one of the upstream mount arms 100. The inner protrusion is connected to (e.g., formed integral with or otherwise attached to) the inner platform, and this inner protrusion projects vertically (e.g., radially outward) into the respective slot 108. Similarly, the outer segment 112 includes an outer platform and an outer protrusion. The outer platform is disposed radially outboard of and may radially engage a respective one of the upstream mount arms 100. The outer protrusion is connected to (e.g., formed integral with or otherwise attached to) the outer platform, and this outer protrusion projects vertically (e.g., radially inwards) into the respective slot 108, for example, to the inner protrusion.

With this arrangement, the respective upstream mount arm 100 is secured (e.g., captured) radially between the inner platform and the outer platform. This arrangement radially and/or laterally anchors (e.g., fixes) the slider 102 to the respective upstream mount arm 100. However, referring to FIG. 5, the slider 102 is configured to move (e.g., slide, translate) longitudinally (e.g., axially forward and aft) within/along the slot 108.

Referring to FIG. 2, the sleeve liner 78 extends axially along the axis 32 from (or about) the sleeve upstream end 68 to (or about) the sleeve downstream end 70. The sleeve liner 78 extends circumferentially about (e.g., completely around) the axis 32, which may provide the sleeve liner 78 with a full-hoop (e.g., tubular) geometry. The sleeve liner 78 extends radially between and to a radial inner side 114 of the sleeve liner 78 and the sleeve outer side 74.

The sleeve liner 78 of FIG. 2 is configured with one or more liner sections 116 and 118. The upstream liner section 116 extends from the sleeve upstream end 68 to the downstream liner section 118. This upstream liner section 116 of FIG. 2 as a (e.g., regular) cylindrical geometry. The upstream liner section 116 may be substantially or exactly parallel with the sleeve support 76 and its support base 82, where the sleeve support 76 and its support base 82 substantially follow a contour of the upstream liner section 116. The downstream liner section 118 is connected to the upstream liner section 116. The downstream liner section 118 extends from the sleeve downstream end 70 to the upstream liner section 116. This downstream liner section 118 of FIG. 2 has a (e.g., curved) frustoconical geometry and radially tapers from (or about) the upstream liner section 116 to (or towards) the sleeve downstream end 70. A radius 119 from the axis 32 to the sleeve outer side 74, for example, decreases as the downstream liner section 118 extends axially along the axis 32 from (or about) the upstream liner section 116 to (or towards) the sleeve downstream end 70. The present disclosure, however, is not limited to such an exemplary sleeve liner arrangement. The downstream liner section 118, for example, may alternatively be configured with a (e.g., curved) frustoconical geometry or otherwise radially varying geometry.

The sleeve liner 78 of FIG. 2 is disposed radially outboard of the sleeve support 76. This sleeve liner 78 extends axially along (e.g., overlaps) and circumferentially about (e.g., circumscribes) the sleeve support 76. The sleeve liner 78 is also coupled to the sleeve support 76 through the downstream mount 84 and the upstream mount 86.

Referring to FIG. 3, the sleeve liner 78 and its upstream liner section 116 is coupled to the downstream mount 84 and each of its downstream mount arms 90. At each downstream mount arm 90, a fastener 120 (e.g., a single bolt) projects radially through the sleeve liner 78 and its upstream liner section 116 as well as the downstream mount 84 and a respective one of its downstream mount arms 90. This fastener 120 mechanically fastens (e.g., pins) the sleeve liner 78 to the respective downstream mount arm 90. Here, each boss 94 is disposed vertically next to and engages the sleeve liner 78. With the foregoing arrangement, the sleeve liner 78 is longitudinally and laterally anchored to the downstream mount 84 and its downstream mount arms 90. However, each of the downstream mount arms 90 is flexible such that its distal arm end 92 may move vertically (e.g., radially in and out) relative to the support base 82. The downstream mount 84 and its downstream mount arms 90 may thereby accommodate (e.g., slight) vertical movement between the sleeve liner 78 and the sleeve support 76. The downstream mount 84 thereby secures the sleeve liner 78 to the sleeve support 76 with one degree of freedom; e.g., a vertical (e.g., radial) degree of freedom.

Referring to FIG. 5, the sleeve liner 78 and its upstream liner section 116 is coupled to the upstream mount 86 and each of its upstream mount arms 100. At each upstream mount arm 100, a fastener 122 (e.g., a single bolt) projects radially through the sleeve liner 78 and its upstream liner section 116 as well as a respective one of the upstream mount arms 100 and a respective one of the sliders 102. This fastener 122 mechanically fastens (e.g., pins) the sleeve liner 78 to the respective slider 102, and that slider 102 couples the sleeve liner 78 to the respective upstream mount arm 100. With the foregoing arrangement, the sleeve liner 78 is laterally anchored to the upstream mount 86 and its upstream mount arms 100. However, as described above, each slider 102 may move longitudinally within the respective slot 108 which facilitates movement (e.g., translation, sliding, etc.) of the sleeve liner 78 longitudinally along the sleeve support 76. Moreover, each of the upstream mount arms 100 is flexible such that its distal arm end 104 may move vertically (e.g., radially in and out) relative to the support base 82. The upstream mount 86 and its upstream mount arms 100 may thereby accommodate (e.g., slight) vertical movement between the sleeve liner 78 and the sleeve support 76. The upstream mount 86 thereby secures the sleeve liner 78 to the sleeve support 76 with multiple (e.g., two) degrees of freedom; e.g., a vertical (e.g., radial) degree of freedom and/or a longitudinal (e.g., axial) degree of freedom.

By movably coupling the sleeve liner 78 to the sleeve support 76, the upstream mount 86 and the downstream mount 84 may accommodate differential thermal expansion between the sleeve liner 78 and the sleeve support 76 during aircraft engine operation. This may be particularly beneficial where the sleeve liner 78 and the sleeve support 76 are formed from different materials with different coefficients of thermal expansion. However, while the upstream mount 86 and the downstream mount 84 facilitate (e.g., slight) shifting between the sleeve liner 78 and the sleeve support 76, the sleeve support 76 may maintain the sleeve liner 78 substantially centered within the flowpath 28.

Referring to FIG. 1, the nozzle sleeve 46 is disposed radially outboard of the inner nozzle wall 44 and its intermediate wall section 57. The nozzle sleeve 46 also extends axially along (e.g., axially overlaps) and extends circumferentially about (e.g., circumscribes) the inner nozzle wall 44 and its intermediate wall section 57. A portion of the nozzle sleeve 46 at the sleeve upstream end 68 is arranged radially next to (e.g., adjacent) the upstream guide 62. A portion of the nozzle sleeve 46 at the sleeve downstream end 70 is arranged radially next to the downstream guide 64. The inner structure 24 thereby forms a radial inner peripheral boundary of the flowpath 28 axially through the variable area nozzle 20. More particularly, the inner nozzle wall 44 and the nozzle sleeve 46 (e.g., the sleeve liner 78) collectively form the radial inner peripheral boundary of the flowpath 28 axially through the variable area nozzle 20.

The actuator mount 48 is configured to provide a mount for attaching the actuation system 26 to the inner structure 24. The actuator mount 48 of FIG. 1, for example, is configured as a bulkhead and/or a frame connected to (e.g., formed integral with or otherwise attached to) the inner nozzle wall 44 at the upstream end 50 of the inner nozzle wall 44. This actuator mount 48 of FIG. 1 projects radially inward from the inner nozzle wall 44 to (or towards) the axis 32.

The actuation system 26 of FIG. 1 includes an actuator 124 which is operatively coupled to the nozzle sleeve 46 and, more particularly, the sleeve support 76. The actuator 124 may be configured as a linear actuator. Examples of the linear actuator include, but are not limited to, a jackscrew and a fluid (e.g., hydraulic) piston. The actuator 124 of FIG. 1 is disposed radially within an interior volume of the inner structure 24 and its inner nozzle wall 44. More particularly, the actuator 124 is located radially inboard of the inner structure 24 and its inner nozzle wall 44. The actuator 124, for example, may be arranged coaxial with the axis 32.

Figure 7A:
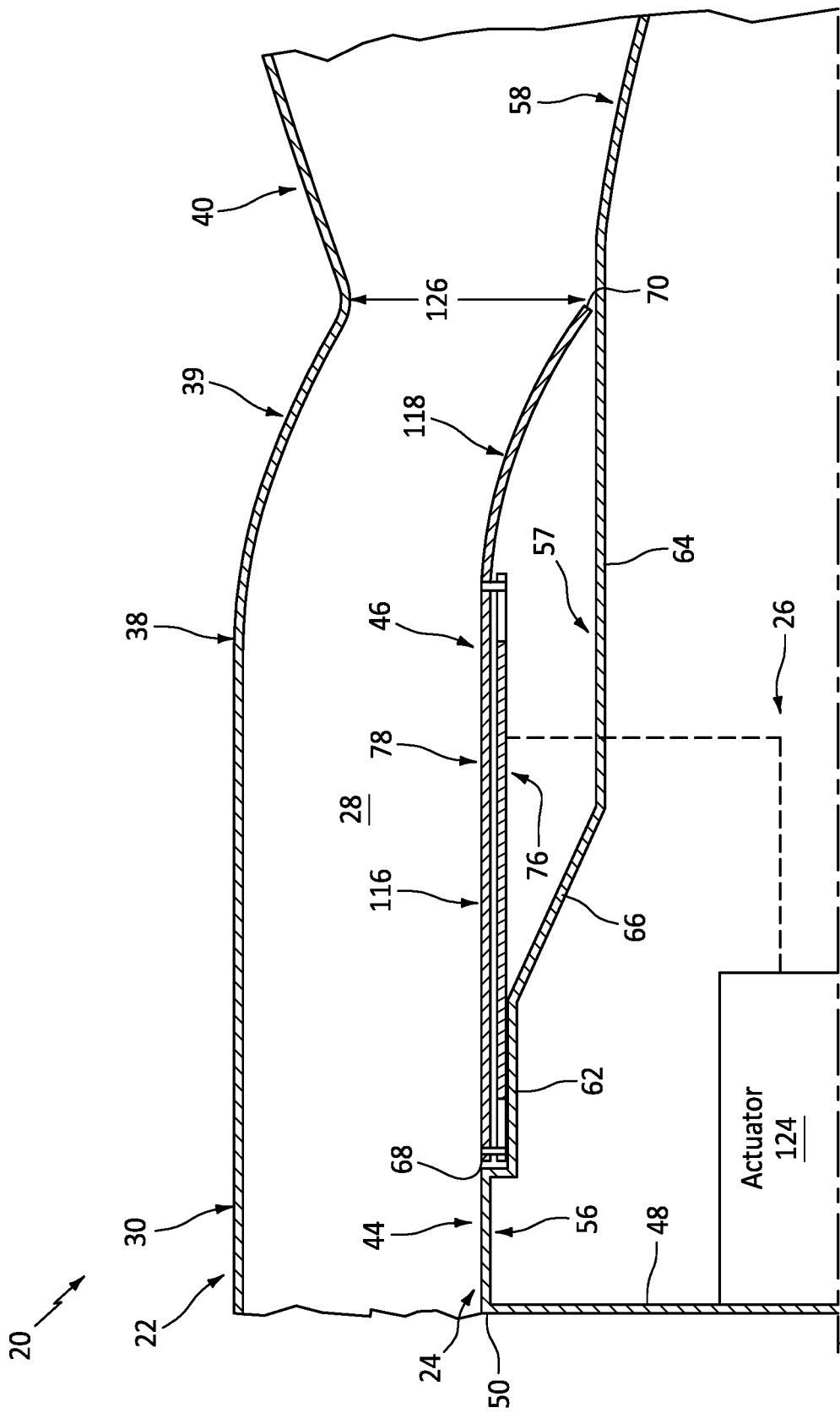
FIGS. 7A and 7B are partial side schematic illustrations of the variable area nozzle with its nozzle sleeve in various positions.
Figure 7B:
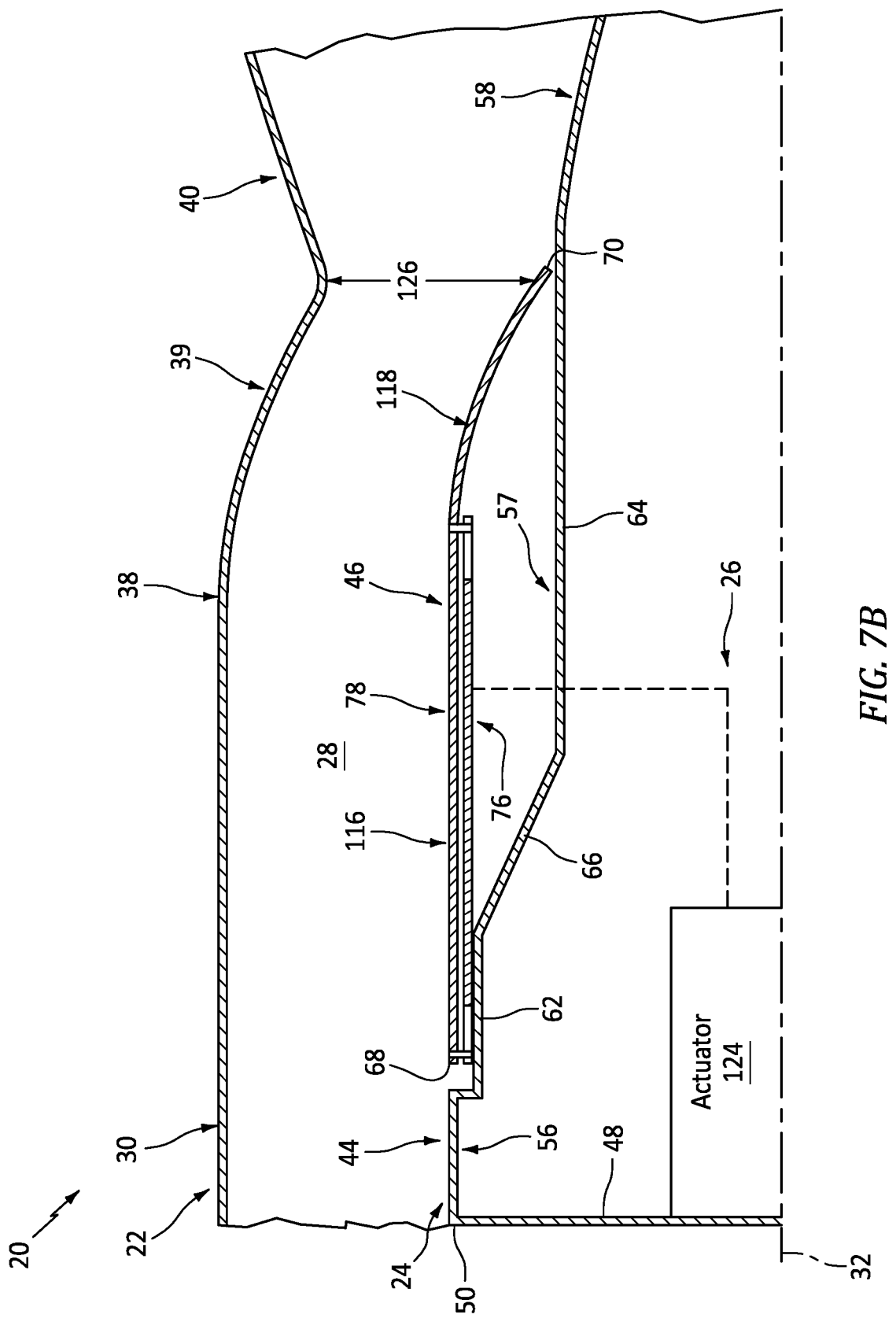

During operation, the actuation system 26 and its actuator 124 may move (e.g., translate) the nozzle sleeve 46 axially along the inner nozzle wall 44 between a first position (e.g., see FIG. 7A) and a second position (e.g., see FIG. 7B). For example, to move the nozzle sleeve 46 towards or to the first position of FIG. 7A, the actuator 124 may move (e.g., pull) the nozzle sleeve 46 axially towards the actuator mount 48 in a forward, upstream direction; e.g., right-to-left. In the first position of FIG. 7A, a choke point through the variable area nozzle 20 has a first cross-sectional area; e.g., see radial flowpath height 126. In another example, to move the nozzle sleeve 46 towards or to the second position of FIG. 7B, the actuator 124 may move (e.g., push) the nozzle sleeve 46 axially away from the actuator mount 48 in an aft, downstream direction; e.g., left-to-right. In the second position of FIG. 7B, the choke point through the variable area nozzle 20 has a second cross-sectional area (e.g., see radial flowpath height 126) which is different (e.g., less) than the first cross-sectional area. Thus, by moving the nozzle sleeve 46 axially somewhere between or to the first position or the second position, flow area through the variable area nozzle 20 may be selectively tailored.

Figure 8:
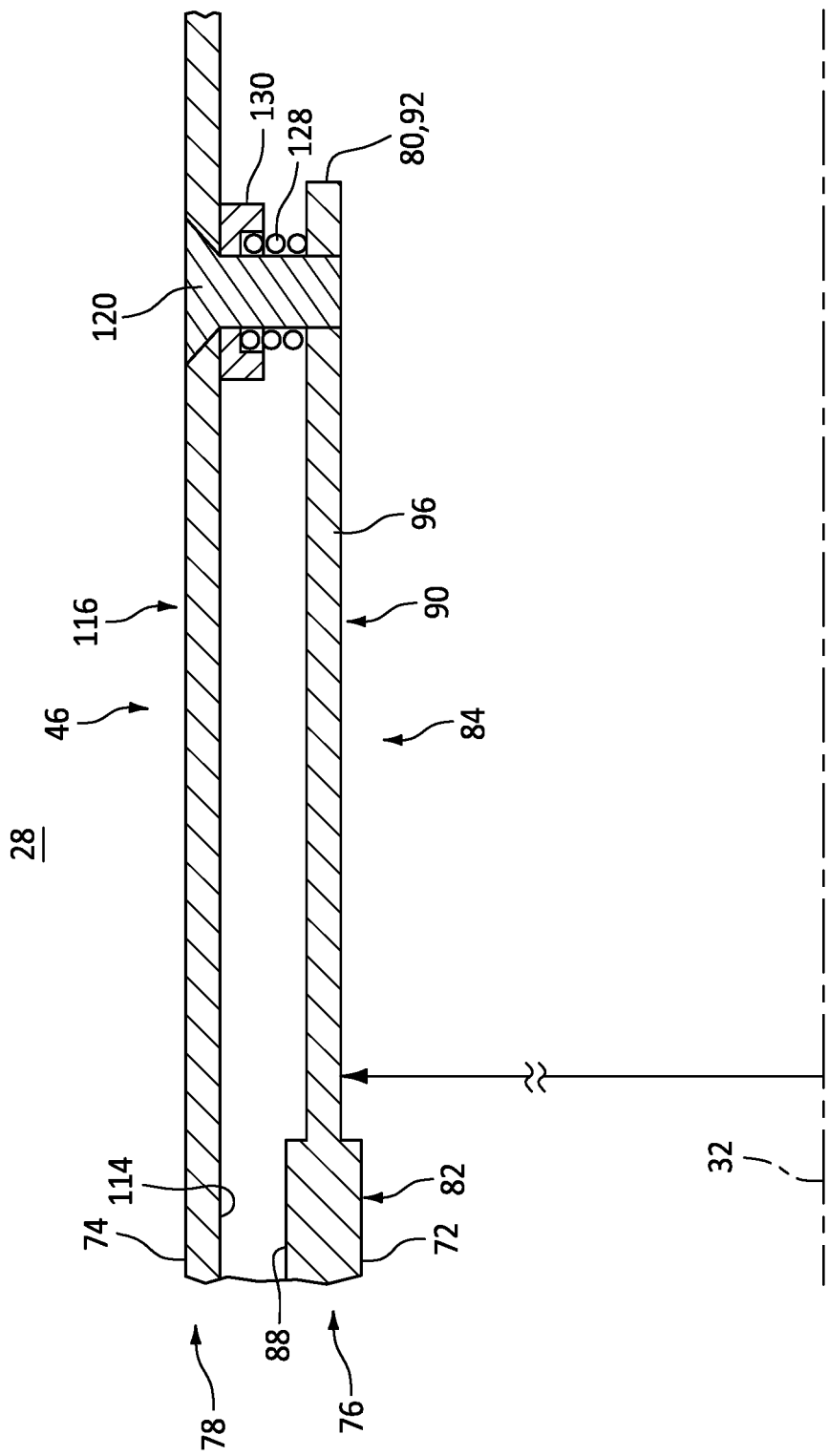
FIG. 8 is a partial side sectional illustration of the nozzle sleeve at the downstream mount with an alternative arrangement.

In some embodiments, referring to FIG. 3, the sleeve liner 78 may abut radially against each downstream mount arm 90. More particularly, the sleeve liner 78 may abut radially against each downstream mount arm boss 94. In other embodiments, referring to FIG. 8, the downstream mount 84 may also include a spring element 128 (e.g., a coil spring) and a spacer 130 (e.g., a puck) for each downstream mount arm 90. The spring element 128 of FIG. 8 is disposed vertically between the respective downstream mount arm 90 and the spacer 130. This spring element 128 may project vertically into and may be seated in a recess in the spacer 130. The spacer 130 is disposed vertically between the spring element 128 and the sleeve liner 78. Here, the respective fastener 120 projects (e.g., sequentially) vertically through the sleeve liner 78, the spacer 130, the spring element 128 and the respective downstream mount arm 90. This fastener 120 may be torqued to preload (or not preload) the spring element 128 between the sleeve liner 78 and the respective downstream mount arm 90.

While the downstream mount 84 is described above as being spaced axially downstream from the upstream mount 86, the present disclosure is not limited to such an exemplary arrangement. In other embodiments, for example, the mount locations may be switched such that the mount 84 is spaced axially upstream from the mount 86.

Figure 9:
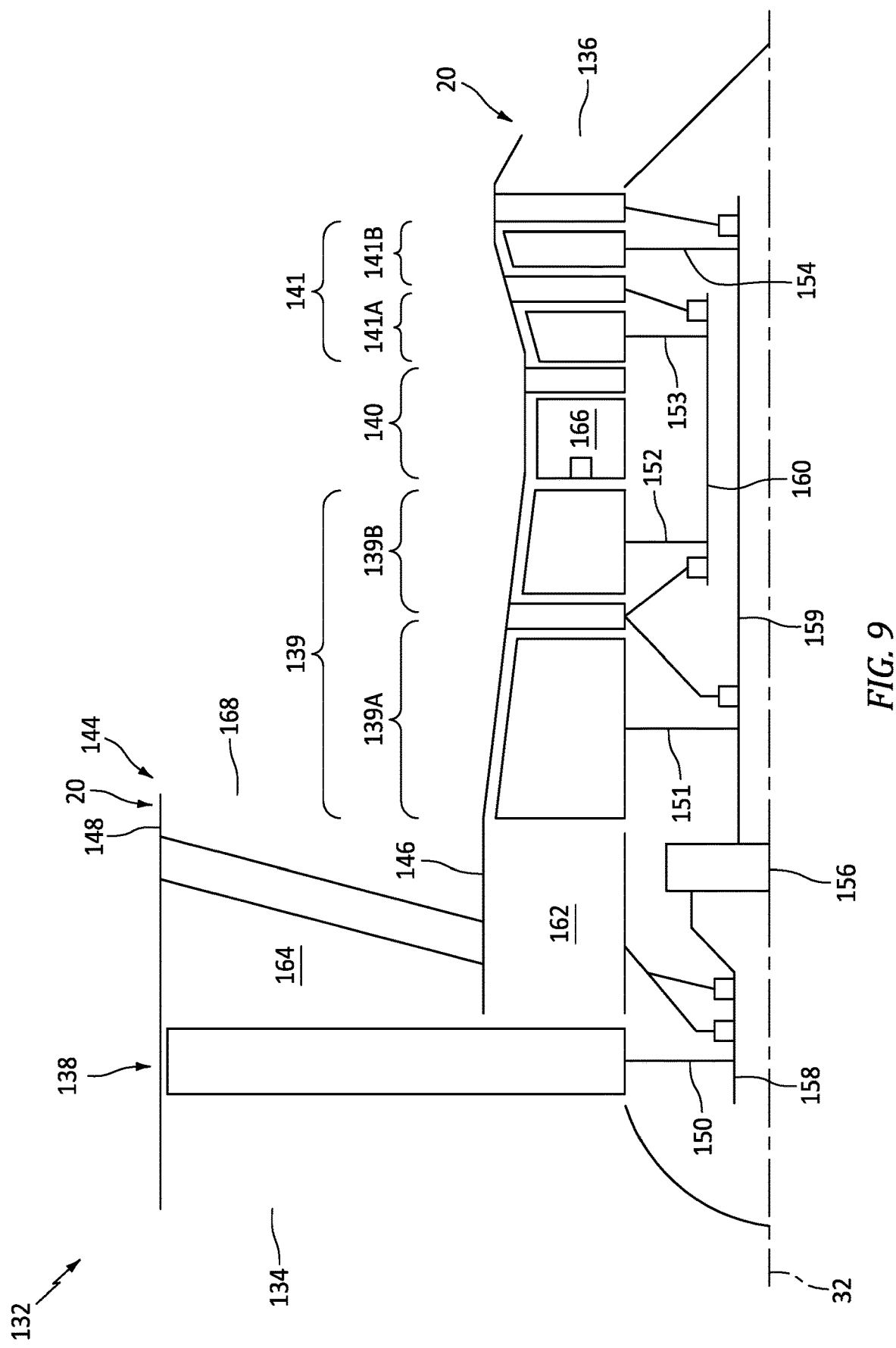
FIG. 9 is a partial side schematic illustration of a gas turbine engine which may include the variable area nozzle.

FIG. 9 illustrates the aircraft engine as a gas turbine engine 132; e.g., a turbofan engine. This turbine engine 132 extends axially along an axial centerline (e.g., the axis 32) between a forward, upstream airflow inlet 134 and an aft, downstream combustion products exhaust 136. The turbine engine 132 includes a fan section 138, a compressor section 139, a combustor section 140 and a turbine section 141. The compressor section 139 includes a low pressure compressor (LPC) section 139A and a high pressure compressor (HPC) section 139B. The turbine section 141 includes a high pressure turbine (HPT) section 141A and a low pressure turbine (LPT) section 141B.

The engine sections 138-141B are arranged sequentially along the axis 32 within an engine housing 144. This engine housing 144 includes an inner case 146 (e.g., a core case) and an outer case 148 (e.g., a fan case). The inner case 146 may house one or more of the engine sections 139A-141B; e.g., an engine core. The outer case 148 may house at least the fan section 138.

Each of the engine sections 138, 139A, 139B, 141A and 141B includes a respective bladed rotor 150-154. Each of these engine rotors 150-154 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 150 is connected to a geartrain 156, for example, through a fan shaft 158. The geartrain 156 and the LPC rotor 151 are connected to and driven by the LPT rotor 154 through a low speed shaft 159. The HPC rotor 152 is connected to and driven by the HPT rotor 153 through a high speed shaft 160.

During turbine engine operation, air enters the turbine engine 132 through the airflow inlet 134. This air is directed through the fan section 138 and into a core flowpath 162 (e.g., the flowpath 28) and a bypass flowpath 164. The core flowpath 162 extends sequentially through the engine sections 139A-141B; e.g., the engine core. The air within the core flowpath 162 may be referred to as "core air". The bypass flowpath 164 extends through a bypass duct, which bypasses the engine core. The air within the bypass flowpath 164 may be referred to as "bypass air".

The core air is compressed by the LPC rotor 151 and the HPC rotor 152 and directed into a (e.g., annular) combustion chamber 166 of a (e.g., annular) combustor in the combustor section 140. Fuel is injected into the combustion chamber 166 and mixed with the compressed core air to provide a fuel-air mixture. This fuel-air mixture is ignited and combustion products thereof flow through and sequentially drive rotation of the HPT rotor 153 and the LPT rotor 154. The rotation of the HPT rotor 153 and the LPT rotor 154 respectively drive rotation of the HPC rotor 152 and the LPC rotor 151 and, thus, compression of the air received from a core airflow inlet. The rotation of the LPT rotor 154 also drives rotation of the fan rotor 150. The rotation of the fan rotor 150 propels the bypass air through and out of the bypass flowpath 164. The propulsion of the bypass air may account for a majority of thrust generated by the turbine engine 132, e.g., more than seventy-five percent (75%) of engine thrust. The turbine engine 132 of the present disclosure, however, is not limited to the foregoing exemplary thrust ratio.

With the arrangement of FIG. 9, the variable area nozzle 20 may be arranged at and may form the combustion products exhaust 136, or alternatively an exhaust 168 from the bypass flowpath 164. The present disclosure, however, is not limited to such an exemplary variable area nozzle arrangement along the core flowpath 162. With different types and configurations of aircraft engines, the variable area nozzle 20 may alternatively be arranged at other (e.g., more upstream) locations along the core flowpath 162. The present disclosure, therefore, is not limited to exhaust nozzle arrangements.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft engine, comprising:
a variable area nozzle including a nozzle wall, a nozzle sleeve, an actuation system and a flowpath extending axially along an axis through the variable area nozzle and radially between the nozzle wall and the nozzle sleeve, and the flowpath circumscribing the nozzle sleeve;
the nozzle sleeve including a support and a liner, the support including a first mount and a second mount axially spaced from the first mount, the liner extending axially along and circumferentially about the support, the liner axially and circumferentially anchored to the support through the first mount, and the liner circumferentially anchored to the support through the second mount, wherein the first mount and the second mount each provide at least one degree of freedom between the liner and the support; and
the actuation system operatively coupled to the support, and the actuation system configured to move the nozzle sleeve axially along the axis relative to the nozzle wall.

2. The assembly of claim 1, wherein the first mount provides a radial degree of freedom between the liner and the support.

3. The assembly of claim 1, wherein
the support further includes a base extending axially along and circumferentially about the axis;
the first mount includes a plurality of mount arms arranged circumferentially about the axis, and each of the plurality of mount arms projects axially out from the base to a respective distal arm end; and
the liner is attached to each of the plurality of mount arms at the respective distal arm end.

4. The assembly of claim 3, wherein each of the plurality of mount arms is flexible such that the respective distal arm end is operable to radially move relative to the base.

5. The assembly of claim 3, wherein the liner is attached to each of the plurality of mount arms with a respective fastener.

6. The assembly of claim 3, wherein
the first mount further includes a plurality of spring elements; and
each of the plurality of spring elements is arranged radially between the liner and a respective one of the plurality of mount arms.

7. The assembly of claim 6, wherein
the first mount further includes a plurality of spacers;
each of the plurality of spacers is arranged radially between the liner and a respective one of the plurality of spring elements; and
each of the plurality of spring elements is seated in a recess in a respective one of the plurality of spacers.

8. The assembly of claim 1, wherein the second mount provides an axial degree of freedom between the liner and the support.

9. The assembly of claim 8, wherein the second mount further provides a radial degree of freedom between the liner and the support.

10. The assembly of claim 1, wherein the second mount includes
a plurality of slots arranged circumferentially about the axis, each of the plurality of slots extending radially through the support; and
a plurality of sliders, each of the plurality of sliders configured to slide axially along a respective one of the plurality of slots.

11. The assembly of claim 10, wherein
the plurality of slots comprises a first slot;
the plurality of sliders comprises a first slider mated with the first slot; and
a portion of the support is radially captured between an inner segment of the first slider and an outer segment of the first slider.

12. The assembly of claim 10, wherein each of the plurality of sliders is circumferentially fixed within the respective one of the plurality of slots.

13. The assembly of claim 10, wherein the liner is attached to each of the plurality of sliders with a respective fastener.

14. The assembly of claim 10, wherein
the support further includes a base extending axially along and circumferentially about the axis;
the second mount further includes a plurality of mount arms arranged circumferentially about the axis, and each of the plurality of mount arms projects axially out from the base to a respective distal arm end; and
each of the plurality of slots extends radially through a respective one of the plurality of mount arms.

15. The assembly of claim 14, wherein each of the plurality of mount arms is flexible such that the respective distal arm end is operable to radially move relative to the base.

16. The assembly of claim 1, wherein the first mount is downstream of the second mount along the flowpath.

17. An assembly for an aircraft engine, comprising:
a support including a base, a first mount and a second mount, the base extending axially along and circumferentially about a centerline axis, the first mount including a plurality of mount arms arranged circumferentially about the axis, each of the plurality of mount arms cantilevered from the base, and the second mount axially spaced from the first mount along the centerline axis; and
a liner extending axially along and circumferentially about the centerline axis, the liner attached to each of the plurality of mount arms, the liner coupled to and slidable along the second mount, and the liner forming a radial peripheral boundary of a flowpath with the liner radially between the support and the flowpath;
wherein the liner is axially and circumferentially anchored to the support through the first mount, and the liner is at an inner peripheral boundary of the flowpath.

18. The assembly of claim 17, wherein the support and the liner are configured as part of a nozzle.

19. The assembly of claim 17, wherein
the liner circumscribes the support; and
the flowpath circumscribes the liner.

20. An assembly for an aircraft engine, comprising:
a variable area nozzle including a nozzle wall, a nozzle sleeve, an actuator and a flowpath extending axially along an axis through the variable area nozzle and radially between the nozzle wall and the nozzle sleeve;

the nozzle sleeve including a support and a liner, the support including a base and a plurality of mount arms, the base extending axially along and circumferentially about the axis, the plurality of mount arms cantilevered from the base and arranged circumferentially about the axis, the liner extending axially along and circumferentially about the axis, the liner attached to each of the plurality of mount arms, and the liner forming a radial inner peripheral boundary of the flowpath with the liner radially between the support and the flowpath, wherein the liner is axially and circumferentially anchored to the support through the plurality of mount arms; and the actuator operatively coupled to the support, and the actuator configured to move the nozzle sleeve axially along the axis relative to the nozzle wall.

\* \* \* \* \*